(12) United States Patent
Stieglitz et al.

(10) Patent No.: US 9,969,114 B2
(45) Date of Patent: May 15, 2018

(54) DEVICE FOR PRODUCING PLASTIC TUBES

(71) Applicant: battenfeld-cincinnati Germany GmbH, Bad Oeyenhausen (DE)

(72) Inventors: Henning Stieglitz, Minden (DE); Heinrich Dohmann, Hoexter (DE)

(73) Assignee: BATTENFELD-CINCINNATI GERMANY GMBH, Bad Oeyenhausen (DE)

( * ) Notice: Subject to any disclaimer, the term of this patent is extended or adjusted under 35 U.S.C. 154(b) by 0 days. days.

(21) Appl. No.: 14/769,458

(22) PCT Filed: Jan. 28, 2014

(86) PCT No.: PCT/EP2014/051600
§ 371 (c)(1),
(2) Date: Aug. 21, 2015

(87) PCT Pub. No.: WO2014/127958
PCT Pub. Date: Aug. 28, 2014

(65) Prior Publication Data
US 2016/0009013 A1    Jan. 14, 2016

(30) Foreign Application Priority Data
Feb. 21, 2013   (DE) ........................ 10 2013 202 798

(51) Int. Cl.
*B29C 47/20*    (2006.01)
*B29C 47/22*    (2006.01)
(Continued)

(52) U.S. Cl.
CPC .......... *B29C 47/22* (2013.01); *B29C 47/0023* (2013.01); *B29C 47/0852* (2013.01);
(Continued)

(58) Field of Classification Search
CPC . B29C 47/0828; B29C 47/0852; B29C 47/22; B29C 47/24; B29C 47/28
See application file for complete search history.

(56) References Cited

U.S. PATENT DOCUMENTS 3,611,493 A    10/1971    Fogelberg et al.
3,649,148 A *   3/1972    Waltman ............. B29C 47/0852
                                                   264/541
(Continued)

FOREIGN PATENT DOCUMENTS

DE    19843341 A1    4/2000
DE    10205210 A1    2/2004
(Continued)

*Primary Examiner* — Yogendra N Gupta
*Assistant Examiner* — Joseph S Leyson
(74) *Attorney, Agent, or Firm* — Leydig, Voit & Mayer, Ltd.

(57) ABSTRACT

An apparatus produces plastic tubes by extrusion with an extruder, a pipehead being attached to the extruder in production direction, having a base material with at least one mandrel and a sleeve, a melt channel between the mandrel and the sleeve, the melt channel shaped to aid flow in production direction at least at the mandrel's end and at the sleeve's end, the mandrel and sleeve being adjustable backwards and forward relatively to one another, the outer surface of the mandrel and/or the inner surface of the sleeve at least partially has a material that allows for a higher sliding quality than the base material. The outer and/or the inner surface (i) has a coating either unvaried, or whose sliding quality constantly improves, or whose sliding quality alternately improves and worsens, in the production direction, or (ii) is partially coated, or (iii) the mandrel and/or sleeve fronts are coated.

19 Claims, 7 Drawing Sheets

(51) Int. Cl.
  *B29C 47/00* (2006.01)
  *B29C 47/08* (2006.01)
  *B29C 47/24* (2006.01)
  *B29C 47/28* (2006.01)
  *B29C 47/02* (2006.01)

(52) U.S. Cl.
  CPC .............. *B29C 47/24* (2013.01); *B29C 47/28* (2013.01); *B29C 47/025* (2013.01); *B29C 47/0828* (2013.01); *B29K 2827/18* (2013.01)

(56) References Cited

U.S. PATENT DOCUMENTS

| | | | | |
|---|---|---|---|---|
| 2003/0077347 | A1* | 4/2003 | Miebach | B29C 47/0007 425/133.1 |
| 2005/0218248 | A1* | 10/2005 | Feuerherm | B29C 47/0026 239/451 |
| 2013/0149406 | A1 | 6/2013 | Kuwazuru et al. | |

FOREIGN PATENT DOCUMENTS

| | | |
|---|---|---|
| EP | 0838322 A2 | 4/1998 |
| EP | 1334815 A1 | 8/2003 |
| JP | S 62149412 A | 7/1987 |
| JP | H 0847963 A | 2/1996 |
| JP | 2000246782 A | 9/2000 |
| JP | 2003311808 A | 11/2003 |
| WO | WO 2012014389 A1 | 2/2012 |

\* cited by examiner

US 9,969,114 B2

DEVICE FOR PRODUCING PLASTIC TUBES

CROSS-REFERENCE TO RELATED APPLICATIONS

This application is a U.S. national stage application under 35 U.S.C. § 371 of International Application No. PCT/EP2014/051600, filed on Jan. 28, 2014, and claims benefit to German Patent Application No. DE 10 2013 202 798.2, filed on Feb. 21, 2013. The International Application was published in German on Aug. 28, 2014, as WO 2014/127958 A1 under PCT Article 21(2).

FIELD

The invention concerns an apparatus for the production of plastic tubes by extrusion.

BACKGROUND

The latest state of the art shows a multitude of apparatus for the production of plastic tubes, among them also pipeheads with lines for molten material that feature an improved sliding quality.

DE 102 05 210 B4, for instance, shows a pipehead comprising a mandrel and a sleeve of which both, the mandrel and the sleeve, consist of segments that are manufactured from different materials, which causes different sliding qualities throughout the melt channel.

SUMMARY

An aspect of the invention provides an apparatus for producing a plastic tube by extrusion with an extruder, the apparatus comprising: a pipehead, attached to the extruder in a production direction, comprising a base material, a mandrel, and a sleeve; and a melt channel, created between the mandrel and the sleeve, the melt channel being shaped to aid the flow in production direction at least at a mandrel end and at a sleeve end, wherein the mandrel and the sleeve are adjustable backwards and forward relatively to one another, wherein an outer mandrel surface and/or an inner sleeve surface at least partially comprises a material that allows for a higher sliding quality than the base material, wherein the outer mandrel surface and/or the inner sleeve surface comprises a coating that does not vary in the production direction, or wherein the outer mandrel surface and/or the inner sleeve surface comprises a coating whose sliding quality constantly improves in the production direction, or wherein the outer mandrel surface and/or the inner sleeve surface comprises a coating whose sliding quality alternately improves and worsens in the production direction, or wherein the outer mandrel surface and/or the inner sleeve surface partially comprises a coating.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
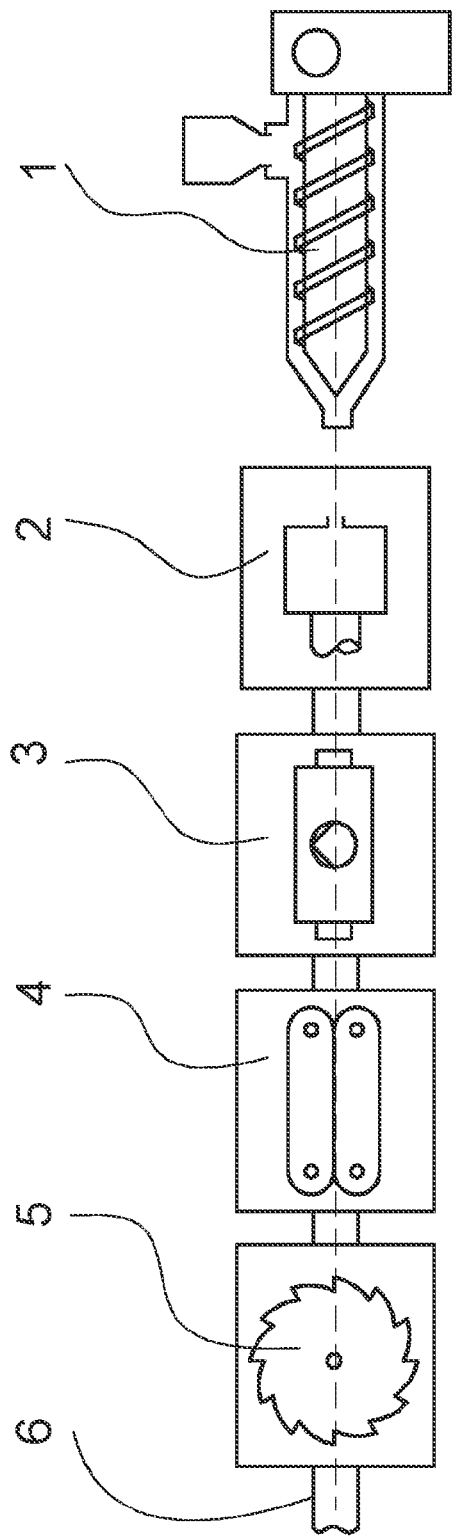
FIG. 1 shows a typical extrusion line.

An aspect of the present invention improves on known pipeheads.

An aspect of the invention provides an apparatus for the production of plastic tubes by extrusion by means of an extruder, a pipehead being attached to the extruder in the production direction, consisting of a base material with at least one mandrel and a sleeve, with a melt channel between the mandrel and the sleeve, the melt channel being shaped to aid the flow in production direction at least at the end of the mandrel and at the end of the sleeve, the mandrel and the sleeve being adjustable backwards and forward relatively to one another, the outer surface of the mandrel and/or the inner surface of the sleeve consisting at least partially of a material that allows for a higher sliding quality than the base material.

An aspect of the invention provides an apparatus or method wherein the outer and/or the inner surface is furnished with a coating that does not vary in the production direction, or the outer and/or the inner surface is furnished with a coating whose sliding quality constantly improves in the production direction, or the outer and/or the inner surface is furnished with a coating whose sliding quality alternately improves and worsens in the production direction, or the outer and/or the inner surface is partially furnished with a coating, or the fronts of the mandrel and/or the front of the sleeve are furnished with a coating.

The flow-supporting build can be adapted to the respective product (type of molten material) to be processed, since not all molten materials are equal. The steel can also have undergone partial heat treatment and/or been polished so as to achieve the different sliding qualities.

These embodiments according to the invention allow for an individual adaptation of the sliding qualities of the melt channel to the different requirements of the production of plastic tubes.

Only in this way it is possible to adapt the sliding quality of the melt channel in the pipehead, e.g. dependently on the material to be processed—or the materials in the case of multi-layer extrusion, so as to achieve the best possible results concerning:

1. The melt flow profile over the width of the flow gap to achieve a minimal drawing of the melt relatively to the flow rate.

This can be practical in the event of redirections as well as compressions and decompressions of the melt in the flow channel. The dwell time of the melt particles can thus be minimized, which is important especially when processing materials that require a short dwell time or in the case of color changes of the melt throughout the flow channel. In sections where different melt flows meet, a targeted improvement of the flow qualities at the flow surfaces can help to optimize the flowing together of the melt flows. Furthermore, the flow quality of already united melt flows can be improved in subsequent critical flow sections in analogy to the materials which require a short dwell time, so as to minimize the risk of a fusion of the melts.

2. The surface quality of the tube to be manufactured.

If the adhesion between the melt and the flow surface is minimal at the nozzle outlet, the shearing stress in the melt flow is minimized as well, as is the risk of a rupture of the melt at the outlet of the melt channel. The undamaged or only minimally damaged surface of the melt flow can thus result in the best possible surface quality of the produced tube.

The addressed surfaces can e.g. be coated with PTFE or sections of the pipehead can be made out of a material whose sliding quality is per se better than that of the base material. The polishing quality, that is, the surface roughness also influences the flowing behavior of the melt. Dependently on the heat treatment of the base material, the grid structure can be influenced and the surface quality can thus be improved. Steel, e.g. CK 45 or CeMo 4, the material preferably used for the production of pipeheads, serves as the base material.

The design of the pipehead can be highly individual. The form of the sleeve as well as that of the mandrel and their combination are rendered in the sub-claims. A conical enlargement and reduction of the diameter of the mandrel towards the end of the mandrel are, for instance, included. The mandrel can also feature a large or small arc/rounding or radius and be tapered continuously.

Analogous embodiments are provided for the sleeve, which can also feature a conically increasing or decreasing inner diameter at its end or have a large or small arc/rounding or radius or be tapered continuously.

The geometrical design of the flow channel depends on the respective demands on the melt delivery within the tool and on the transition section from the tool outlet to the inlet section of the calibration sleeve. Within the tool, a compression section before the outlet of the melt, for instance, can have a positive impact on the quality of the produced pipe for certain molten materials. For materials that require a short dwell time, necessary redirections of the melt flow should also be realized with large radii and a minimal change of compression.

Further advantageous variations and improvements are rendered in the sub-claims.

FIG. 1 depicts a typical extrusion line as used today for profile extrusion, be it in the production of window profiles or tubes. It shows an extruder (1) in which plastic is molten and continuously driven towards the extrusion tool (2) for forming. Adjoined to the extrusion tool (2) is a calibration and cooling station (3). Depending on the profile, several cooling stations are possible. An extraction device (4) follows the cooling stations. A cutting device (5) serves to cut the continuous profiles (6) to the correct length.

Figure 2:
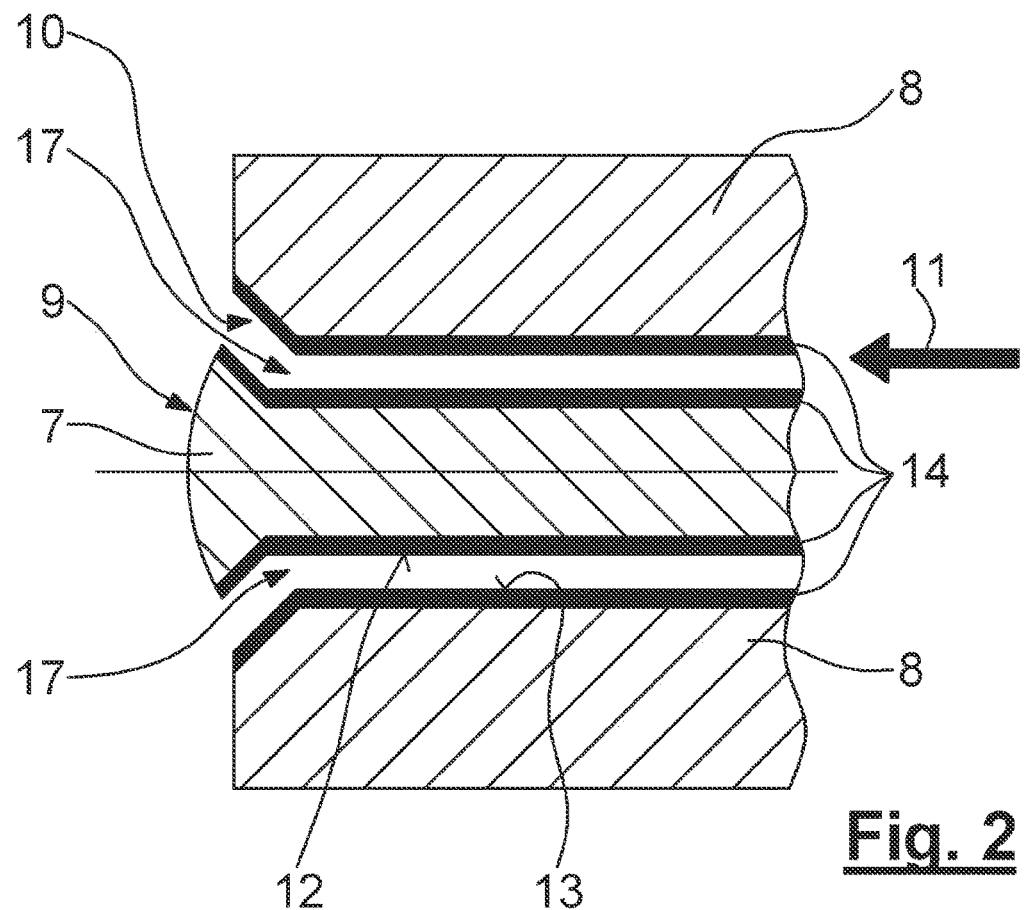
FIG. 2 shows a longitudinal section of the pipehead.

FIG. 2 depicts a subsection of a longitudinal section along the central axis of extrusion through the tool (2), namely the pipehead. As in all the following figures, the schemata show only the end section of the sleeve and the mandrel, but no other component parts. A mandrel (7) and a sleeve (8) can be seen. The diameter of the mandrel (7) conically increases at the end of the mandrel (9), as does the inner diameter of the sleeve (8) at the end of the sleeve (10). Depending on the angles within the cone, the design of the melt channel (17) can vary at the outlet of the pipehead. This variation is also due to a shift of the mandrel (7) relatively to the sleeve (8), regardless of whether the sleeve (8) is being shifted in relation to the mandrel (7) or vice versa. Both variants can be provided. Both, the outside (12) of the mandrel (7) and the inside (13) of the sleeve (8) are furnished with a coating (14). The production direction of the tube (6) is rendered with an arrow (11).

Figure 3:
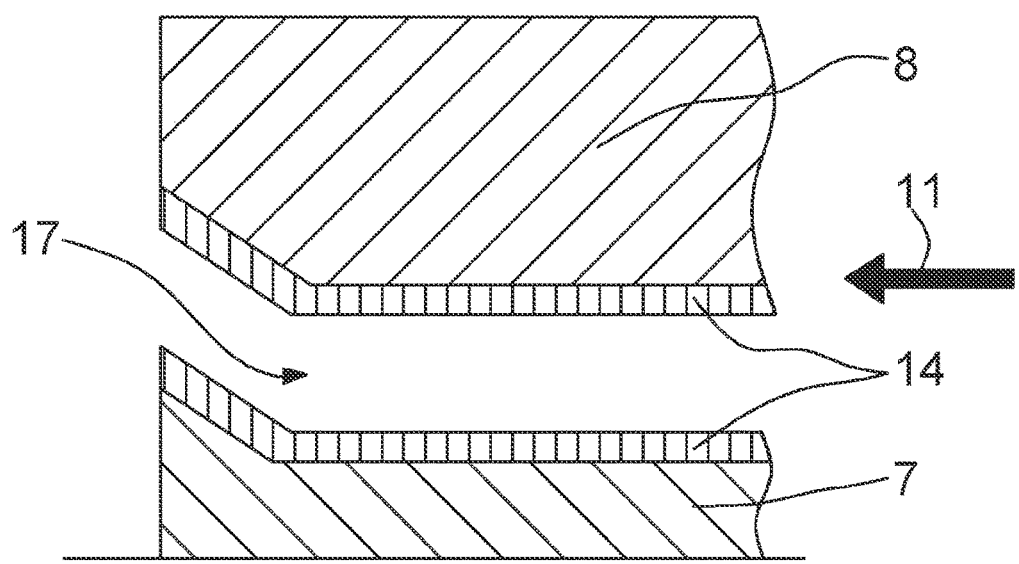
FIG. 3 shows a half-section according to FIG. 2.

FIG. 3 only shows a half section of FIG. 2 in an enlarged representation so as to illustrate the coating (14) on the surfaces of the sleeve (8) and the mandrel (7). Equal parts are numbered equally.

Figure 4:
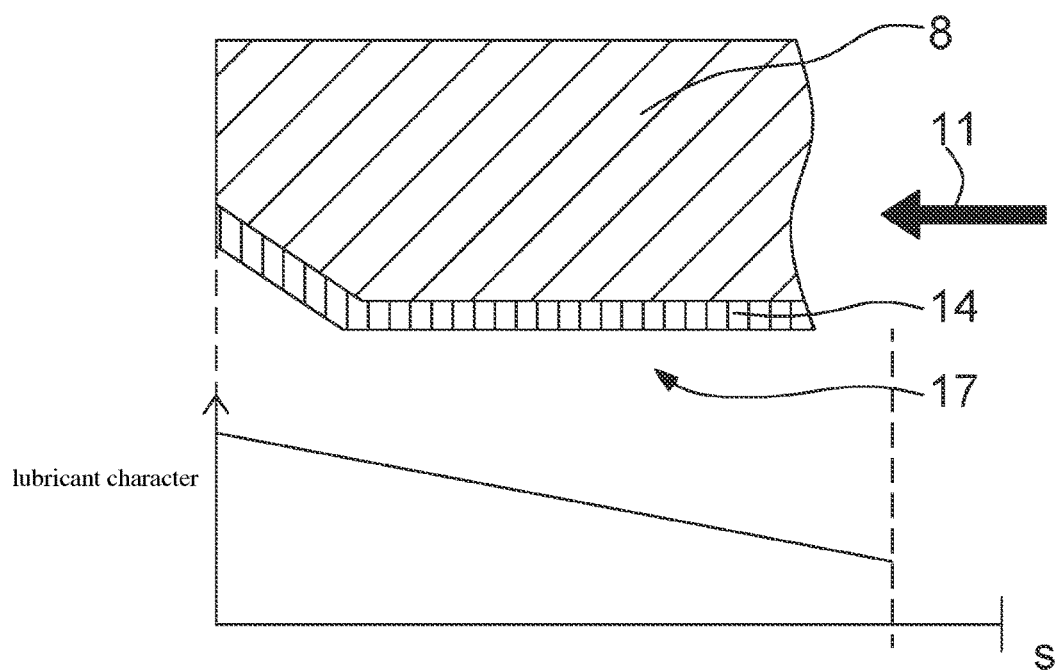
FIG. 4 shows a half-section of the sleeve with a diagram.

FIG. 4 only depicts a half section of the sleeve (8) and below that the general development of the sliding quality throughout the depicted longitudinal axis of the sleeve (8). The sleeve (8) is furnished with a coating (14) whose sliding quality improves in production direction (11). This improvement is rendered by the graph that constantly rises in production direction.

Figure 5:
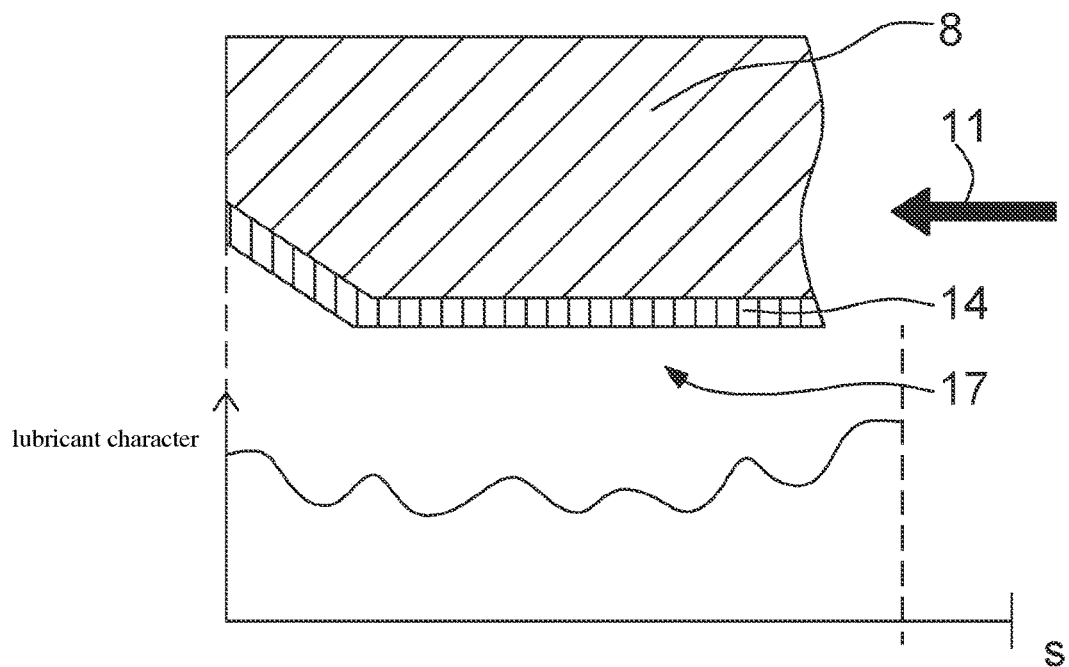
FIG. 5 shows an alternative for FIG. 4.
Figure 6:
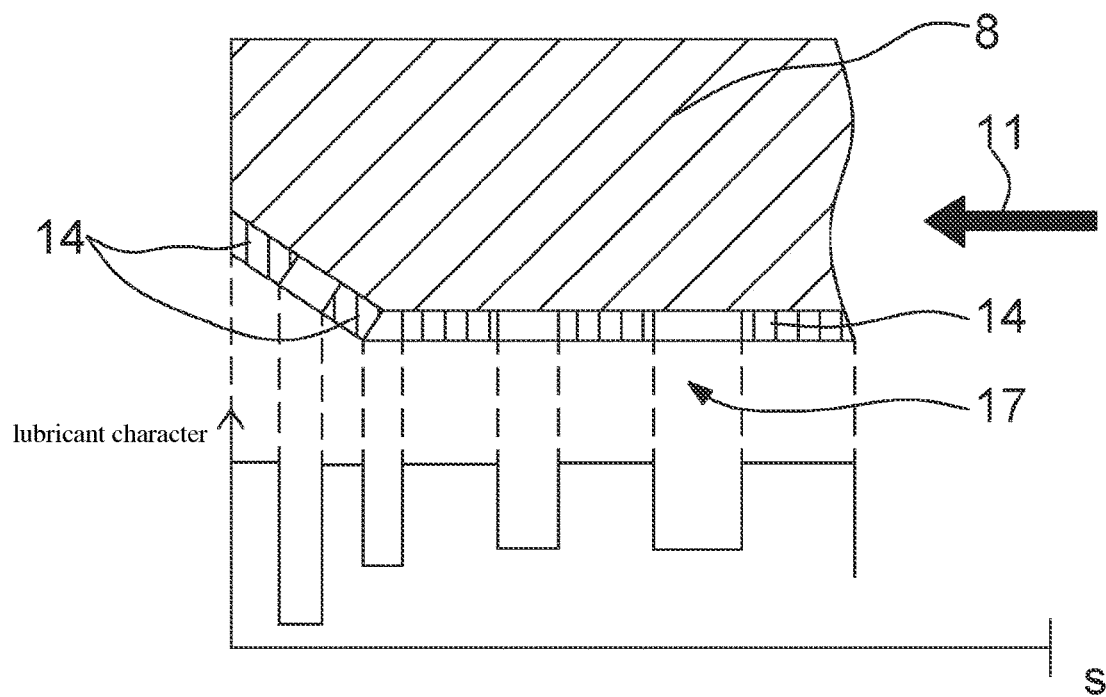
FIG. 6 shows another alternative for FIG. 4.

FIGS. 5 and 6 depict different developments of the sliding quality according to FIG. 4, equal parts being again numbered equally. An abrupt rise (FIG. 6) and a sinusoidal development (FIG. 5) of the sliding quality are rendered. The sliding quality can of course have different developments as well. The front end of the pipehead is not depicted. If it was, the development of the sliding quality throughout the whole pipehead would e.g. be parabolic, the quality decreasing from the beginning and then increasing again towards the end. The in-between development could then of course be sinusoidal again or else resemble any other function.

As depicted in FIG. 6, an only partial coating (14) is also possible, which would lead to a step-like development.

Figure 7:
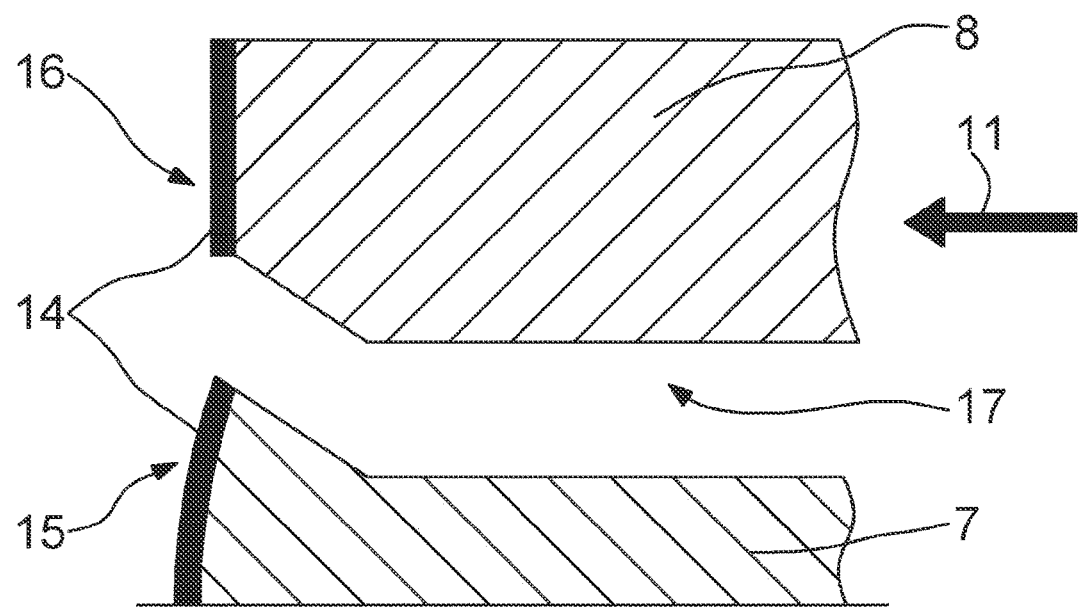
FIG. 7 shows another alternative for FIG. 3.

For the design according to FIG. 7, the coating (14) is applied only to the sides (15 & 16) of the sleeve (8) and the mandrel (7). Thus, an excretion of sediments from the melt flow at the outlet of the pipehead is realized. It is not necessary for every specific application for both sides to be coated; depending on the application, it may be sufficient if only the front of the sleeve (8) or of the mandrel (7) are coated. A material or coating can as well be provided that features analogous adhesion and/or sliding properties.

As has already been elaborated, the aim of a changing of the sliding properties can also be achieved through an adequate choice of material or a variety of materials as well as through the polishing property and/or heat treatment of the base material, thus replacing the coating. In the given figures, only one design of the pipehead with mandrel (7) and sleeve (8) has been depicted in each case. However, according to the invention, this can be applied to all further designs of the mandrel (7) and the sleeve (8).

Figure 8A:
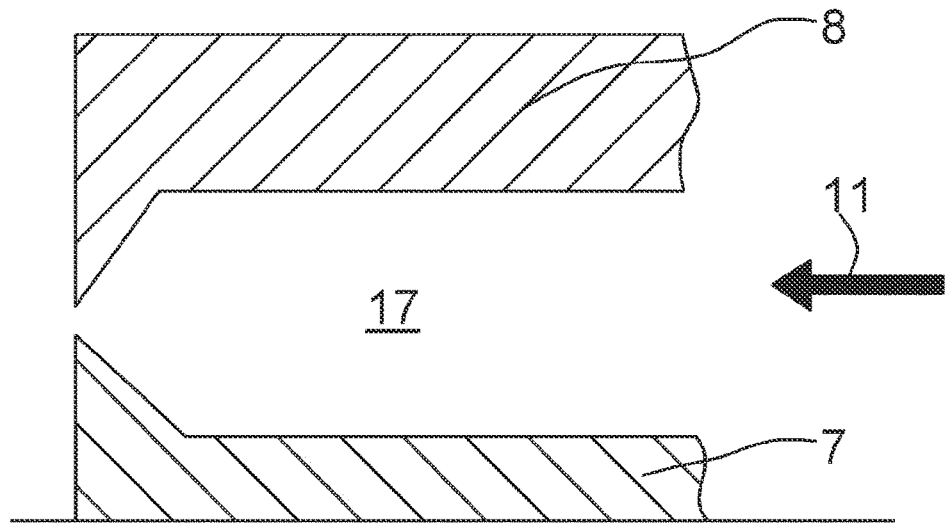
FIGS. 8a, 8b show further alternative embodiments.
Figure 8B:
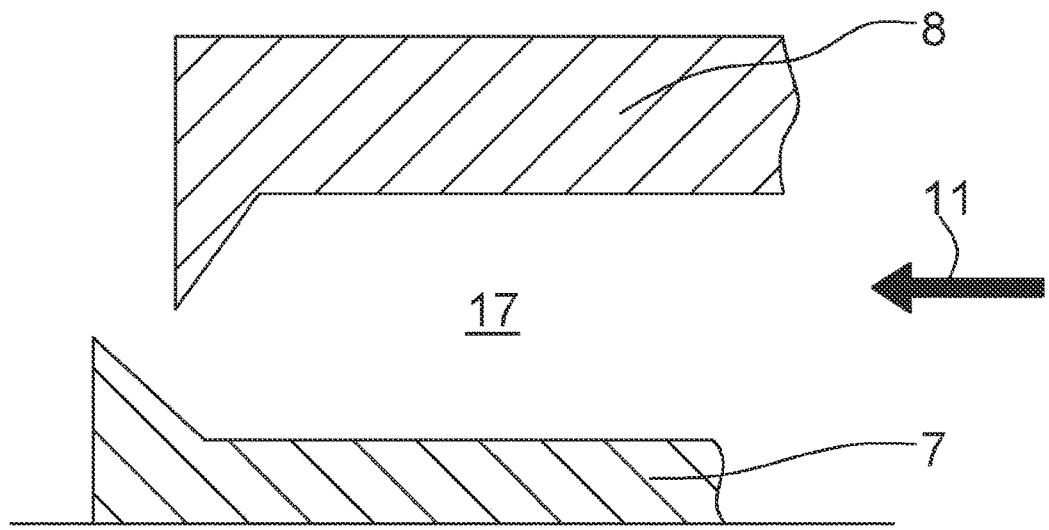

Serving merely as an example, FIG. 8 depicts a case in which the inner diameter of the sleeve (8) conically decreases at the sleeve's end (10) and the diameter of the mandrel (7) conically increases at the end of the mandrel (9). In the first FIG. 8a), the melt channel (17) is almost closed at the end of the pipehead, while in the figure below (8b), the opening is widened due to a shift of the mandrel (7) relatively to the sleeve (8). The coating patterns represented in FIGS. 2 to 7 are equally valid here, but have not been depicted.

Figure 9:
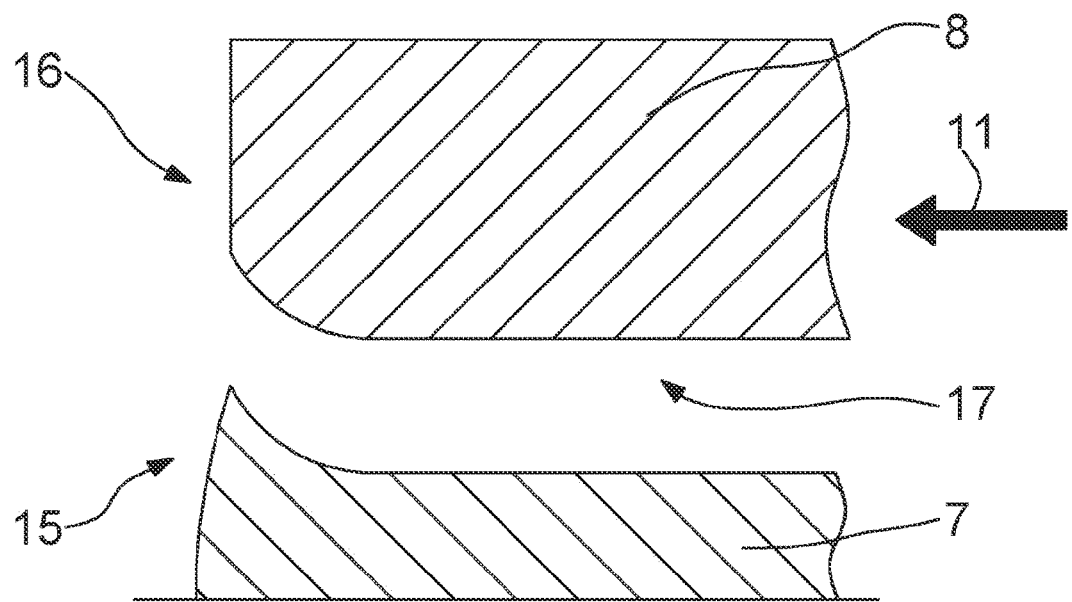
FIG. 9 shows a further alternative embodiment.

FIG. 9 shows a design in which the end of the sleeve (10) and the end of the mandrel (9) are rounded. The rounding does not necessarily have to have a regular radius, but can as well be a curve or the arrangement of several radii. In every case, the diameter of the mandrel (7) and the diameter of the sleeve (8) are increased towards the end by means of an arched section.

Figure 10:
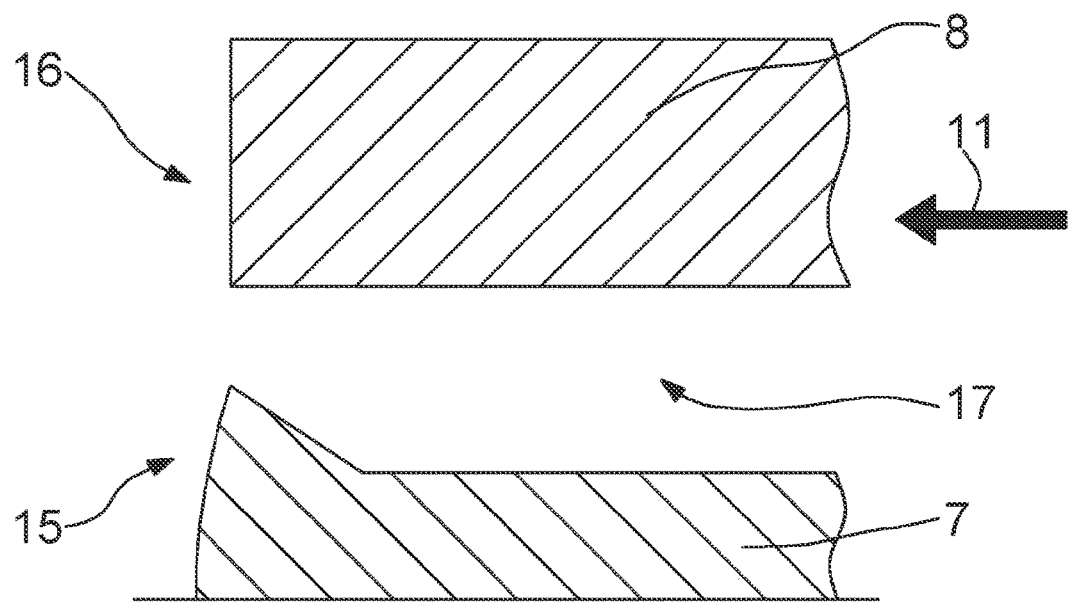
FIG. 10 shows a further alternative embodiment.

In the embodiment according to FIG. 10, the diameter of the sleeve (8) remains unchanged, while the diameter of the mandrel (7) increases, which has been realized here with the help of a conical end of the mandrel (9). However, this can as well be implemented with an end of the mandrel (9) according to FIG. 9 (round).

Figure 11:
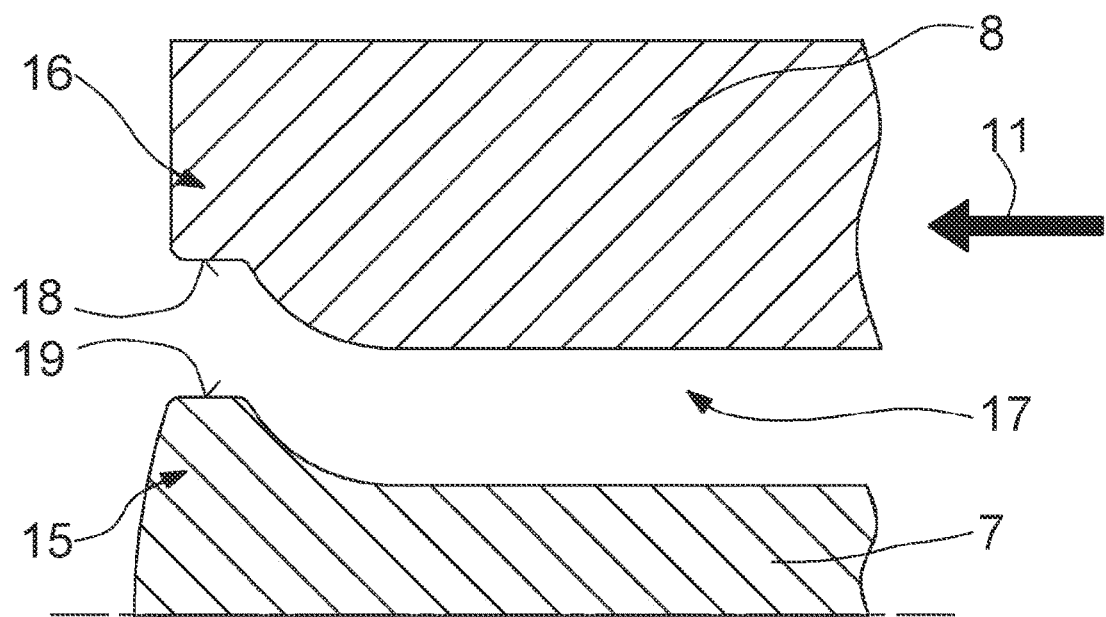
FIG. 11 shows an addition that is realizable for all embodiments.

In FIG. 11, the design according to FIG. 9 has been altered such that after the changing of the diameter by means of a rounded end, a straight component part is attached which runs parallel to the central axis. The surface section (18) of the sleeve (8) and the surface section (19) of the mandrel (7) are therefore cylindrical and form the end of the melt channel (17).

This cylindrical end can of course be realized for all the possible designs.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LEGENDS

1 Extruder
2 Extrusion tool
3 Calibration and cooling section
4 Extraction device
5 Cutting device
6 Profile
7 Mandrel
8 Sleeve
9 End of 7
10 End of 8
11 Production direction
12 Outer surface of 7
13 Inner surface of 8
14 Coating
15 Front of 7
16 Front of 8
17 Melt channel
18 Surface section of the sleeve (8)
19 Surface section of the mandrel (7)

The invention claimed is:

1. An apparatus for producing a plastic tube by extrusion with an extruder, the apparatus comprising:
   a pipehead, attached to the extruder in a production direction, comprising a base material, a mandrel, and a sleeve; and
   a melt channel, created between the mandrel and the sleeve, the melt channel being shaped to aid the flow in production direction at least at a mandrel end and at a sleeve end,
   wherein the mandrel and the sleeve are adjustable backwards and forwards relatively to one another,
   wherein an outer mandrel surface and/or an inner sleeve surface at least partially comprises a material that allows for a higher sliding quality than the base material,
   wherein the outer mandrel surface and/or the inner sleeve surface comprises a coating whose sliding quality constantly improves in the production direction, or
   wherein the outer mandrel surface and/or the inner sleeve surface comprises a coating whose sliding quality alternately improves and worsens in the production direction.

2. The apparatus of claim 1, wherein a mandrel diameter at the mandrel end, and an inner sleeve diameter at the sleeve end, conically increase.

3. The apparatus of claim 1, wherein the mandrel end and the sleeve end are rounded or implemented with a radius.

4. The apparatus of claim 1, wherein the mandrel end is rounded or implemented with a radius, and
   wherein an inner sleeve diameter conically decreases at the sleeve end.

5. The apparatus of claim 1, wherein a mandrel diameter conically increases at the mandrel end, and
   wherein the sleeve end is rounded or implemented with a radius.

6. The apparatus of claim 1, wherein a mandrel diameter conically increases at the mandrel end, and
   wherein and the sleeve end is tapered.

7. The apparatus of claim 1, wherein a mandrel diameter conically increases at the mandrel end, and
   wherein an inner sleeve diameter conically decreases at the sleeve end.

8. The apparatus of claim 1, wherein the mandrel end is tapered, and
   wherein an inner sleeve diameter conically decreases at the sleeve end.

9. The apparatus of claim 1, wherein the mandrel end is rounded or implemented with a radius, and
   wherein an inner sleeve diameter conically increases at the sleeve end.

10. The apparatus of claim 1, wherein the mandrel end is rounded or implemented with a radius, and
    wherein the sleeve end is tapered.

11. The apparatus of claim 1, wherein a mandrel diameter at the mandrel end and an inner sleeve diameter at the sleeve end conically decrease.

12. The apparatus of claim 1, further comprising:
    two additional surface sections, attached to the mandrel end and the sleeve end,
    wherein the two additional surface sections are parallel and cylindrical.

13. The apparatus of claim 1, wherein the coating comprises PTFE.

14. The apparatus of claim 1, wherein a higher sliding quality is realized using inserted rings comprising or coated with a second material, other than the base material.

15. The apparatus of claim 1, wherein mandrel and/or sleeve front sides comprise a coating.

16. The apparatus of claim 1, wherein the outer mandrel surface comprises a coating that does not vary in the production direction.

17. The apparatus of claim 1, wherein the inner sleeve surface comprises a coating that does not vary in the production direction.

18. The apparatus of claim 1, wherein the outer mandrel surface comprises a coating whose sliding quality constantly improves in the production direction.

19. The apparatus of claim 1, wherein the inner sleeve surface comprises a coating whose sliding quality constantly improves in the production direction.

* * * * *